US006885131B2

United States Patent
Hirn et al.

(10) Patent No.: US 6,885,131 B2
(45) Date of Patent: Apr. 26, 2005

(54) METHOD FOR CONTROLLING A PIEZOELECTRIC ACTUATOR WHICH IS USED TO DISPLACE AN ELEMENT

(75) Inventors: Rainer Hirn, Neutraubling (DE); Arno Friedrich, Regensburg (DE); Uwe Jung, Wörth a. d. Donau (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/477,588

(22) PCT Filed: May 2, 2002

(86) PCT No.: PCT/DE02/01596

§ 371 (c)(1),
(2), (4) Date: Nov. 13, 2003

(87) PCT Pub. No.: WO02/092985

PCT Pub. Date: Nov. 21, 2002

(65) Prior Publication Data

US 2004/0145274 A1 Jul. 29, 2004

(30) Foreign Application Priority Data

May 14, 2001 (DE) .......................................... 101 23 372

(51) Int. Cl.⁷ ............................................... H01L 41/08
(52) U.S. Cl. ............. 310/316.01; 123/490; 310/316.03; 310/315

(58) Field of Search .............................. 310/315, 316.01, 310/316.03, 328, 330–332; 123/490, 498; 239/585.1

(56) References Cited

U.S. PATENT DOCUMENTS

| 4,499,878 A | * | 2/1985 | Igashira et al. ............. 123/478 |
| 6,121,715 A | | 9/2000 | Hoffmann et al. |
| 6,619,268 B1 | * | 9/2003 | Rueger et al. ............... 123/490 |
| 6,820,474 B1 | * | 11/2004 | Rueger ....................... 73/119 A |

FOREIGN PATENT DOCUMENTS

| DE | 196 52 801 C1 | 4/1998 |
| DE | 198 05 184 A1 | 8/1999 |
| DE | 198 41 460 A1 | 3/2000 |
| DE | 199 31 233 A1 | 1/2001 |
| DE | 100 12 607 A1 | 9/2001 |
| DE | 199 05 340 C2 | 9/2001 |
| JP | 03249371 A | 11/1991 |

* cited by examiner

*Primary Examiner*—Mark Budd
(74) *Attorney, Agent, or Firm*—Cohen, Pontani, Lieberman & Pavane

(57) ABSTRACT

The invention relates to the return stroke between an actuator and an element. In order to displace the element the actuator (A) is impinged upon by a control voltage (ANS). The control voltage (ANS) is selected in such a manner that it is dependent on the size of return stroke in order to compensate the alteration in the return stroke.

9 Claims, 1 Drawing Sheet

METHOD FOR CONTROLLING A PIEZOELECTRIC ACTUATOR WHICH IS USED TO DISPLACE AN ELEMENT

This is a U.S. national stage of application No. PCT/DE02/01596, filed on 02 May 2002. Priority is claimed on the following application(s): Country: Germany, Application No.: 101 23 372.8, Filed: 14 May 2001, under 35 U.S.C. §119(a) and 35 U.S.C. §365(b).

BACKGROUND OF THE INVENTION

1. Field of the Invention

The invention relates to a method for controlling a piezoelectric actuator which is used to displace an element. With a method of this kind the actuator has a control voltage applied to it. Because of the change in length of the actuator induced by the activation the element is displaced.

2. Description of the Prior Art

Piezoelectric actuators are used for example in fuel injection systems. In this case the element is a control valve which is operated by the actuator.

Since the length of the piezoelectric actuator is dependent on temperature, a safety gap, referred to as the return stroke, should exist between the actuator in the non-activated state and the element, said gap ensuring that even in the event of temperature changes the non-activated actuator does not displace the element.

Efforts are being made to make the size of the return stroke independent of ambient influences, as otherwise the element will be displaced more or less forcefully or in the extreme case not at all when the actuator is activated. With a fuel injector, a change in the return stroke effects for example a delay in the start of injection and the end of injection, which can result in high emissions and loud combustion noises.

It is known that the influence of temperature fluctuations on the return stroke can be diminished if elements which determine the size of the return stroke are made of materials with coordinated thermal coefficients of expansion. Invar, for example, has revealed itself to be a suitable material for a housing for the piezoelectric actuator.

However, compensating for the temperature-induced expansion of the actuator does not entirely succeed by this measure, since not all the components surrounding the actuator can be made of invar. Moreover, the measure does not help in the case of changes in the return stroke caused by ambient influences that are not temperature-induced.

SUMMARY OF THE INVENTION

The object of the invention is to specify a method for controlling an actuator which is used to displace an element, wherein the influence by ambient conditions on the displacement of the element is prevented or at least minimized.

The object is achieved by a method for controlling a piezoelectric actuator which is used to displace an element with the following features: between the actuator and the element there is a return stroke. In order to displace the element a control voltage is applied to the actuator. The control voltage is selected such that it is dependent on the size of the return stroke with the aim of compensating for a change in the return stroke.

With this method no attempt is made to make the size of the return stroke independent of ambient influences; instead, a change in the return stroke is compensated for by a suitable control voltage.

If, for example, the return stroke increases in size, then the control voltage is selected correspondingly higher so that the actuator can overcome the greater distance to the element and displace the element with the necessary force. Even the smallest changes in return stroke can be compensated for by this method, which means that the displacement of the element is essentially independent of ambient conditions. Since by means of this method the change in return stroke can in principle be compensated for independently of its cause, the method is also suitable for eliminating the influence of ambient conditions that are not temperature-induced on the displacement of the element.

Preferably the method is performed in such a way that the control voltage is formed from a sum of at least one first voltage and a compensation voltage, with only the compensation voltage being dependent on the size of the return stroke. Because of the separation of the compensation voltage as a summand to be added, the method can be implemented by means of a particularly simple and straightforward device. Toward that end, the device comprises on the one hand a basic value calculation that is permanently active and on the other hand a correction value calculation which is performed as a function of the ambient conditions.

The first voltage can be a fixed basic voltage.

In particular for use in fuel injector applications, the first voltage is preferably dependent on variables such as, for example, engine load, engine speed or fuel pressure so that the amount of fuel to be injected, the start of injection and the end of injection can be adjusted to the current operating condition, such as, for example, accelerating from rest or coasting to a halt.

In order to establish the compensation voltage, the value of a parameter which serves as a measure for the current size of the return stroke is determined.

The capacitance of the actuator, for example, can be used for the parameter. For example, the parameter can be the capacitance of the actuator. If a plurality of actuators are disposed in the same device and if they perform essentially the same function, the parameter can instead be a mean value of the capacitances of the actuators. This is the case, for example, with a multi-cylinder engine which has one fuel injector per cylinder.

It has been shown that the capacitance of the actuator is dependent on the temperature of the actuator irrespective of how it is controlled. From the temperature of the actuator deductions can in turn be made about the temperature-induced change in the return stroke, so that the capacitance of the actuator represents a measure for the size of the return stroke. The use of such a parameter permits the compensation of temperature-induced changes in the return stroke.

If the actuator and the element are used in a fuel injector, a valve is used as the element, said valve regulating the amount of fuel to be injected.

In this case the fuel temperature can be used for the parameter.

The coolant temperature can also be used for the parameter. In this case, during the determination of the dependence of the control voltage on the value of the parameter, the running time of the engine is also taken into account in that the temperature of the actuator is deduced from the coolant temperature at the time of starting the engine and from the current running time of the engine.

A stored assignment of parameter values to compensation voltages can be used to determine the compensation voltage from the value of the parameter.

The assignment can be determined on the basis of a model actuator and subsequently stored in all actuators manufactured in accordance with the model actuator. To this end, a number of different ambient conditions of the model actuator are set. The associated value of the parameter is determined for each of the ambient conditions. For each of the ambient conditions, the particular control voltage at which the actuator operates the element in the desired fashion, e.g. with a specific force, is determined. If the first voltage is known, the compensation voltage can be determined from the control voltage. For use in a fuel injector application, the compensation voltage can be established by means of a check to determine at which control voltage the right amount of fuel is injected.

The value of the parameter for a specific environmental condition can, however, vary from actuator to actuator for manufacturing process related reasons. In order to be able to adjust the initially stored assignment determined on the basis of the model actuator in simple fashion to the particular actuator, it is advantageous to determine the compensation voltage in the method for controlling the actuator by forming the difference value from the value of the parameter and a fixed stored value and then determining the corresponding compensation voltage from a stored assignment of difference values to compensation voltages. This assignment can also be determined on the basis of a model actuator. In this case it is sufficient for the purposes of adjustment to measure the value of the parameter under the same ambient condition under which the fixed stored value was measured in the case of the model actuator, and in the event of a deviation to replace the fixed stored value with the measured value of the parameter of the actuator.

For use in a fuel injector application, the above-mentioned ambient condition is preferably the status of the fuel injector at operating temperature, since this ambient condition can be set easily without additional measurements by waiting a sufficiently long time after startup until there is a high probability that the operating temperature of the fuel injector has been reached.

The calculation of the required control voltage is performed for example by a control unit.

The charging current with which the actuator is charged during activation is dependent on the control voltage and is set as a function of resistances and capacitances in the circuit of the control unit and the actuator. Since the charging current is dependent on the size of the control voltage, the expansion of the actuator is not proportional to the control voltage. However, the control energy with which the actuator is charged is proportional to the expansion of the actuator. The control energy is yielded as the result of the multiplication of the control voltage by the charging current and the charging time. Consequently it is recommended that the control voltage be determined on the basis of a calculation of the control energy. Since the charging current is clearly and invariably dependent on the control voltage and the charging time is independent of the control voltage, there is a one-to-one relationship between control voltage and control energy. Consequently the control voltage is determined indirectly by determination of the control energy.

Thus, the first voltage and the compensation voltage can be determined indirectly by determination of a first energy and a compensation energy.

The stored assignment of parameter values to compensation voltages can consist of a stored assignment of parameter values to compensation energies.

BRIEF DESCRIPTION OF THE DRAWINGS

An exemplary embodiment of the invention is explained in more detail below with reference to the figures.

DETAILED DESCRIPTION OF THE PREFERRED EMBODIMENTS

Figure 1:
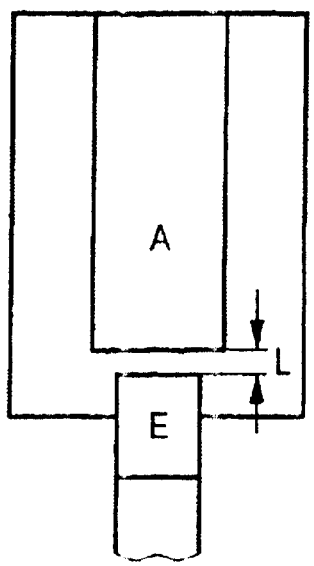
FIG. 1 is a schematic view of a piezoelectric actuator with an actuator housing and an element.

In the exemplary embodiment there are provided four fuel injectors which feed a combustion chamber. Each of the fuel injectors has a piezoelectric actuator A which is used to displace an element E which is implemented as a control valve. Provided between the actuators A in the non-activated state and the elements E there is in each case a gap which is referred to as return stroke L (see FIG. 1).

Figure 2:
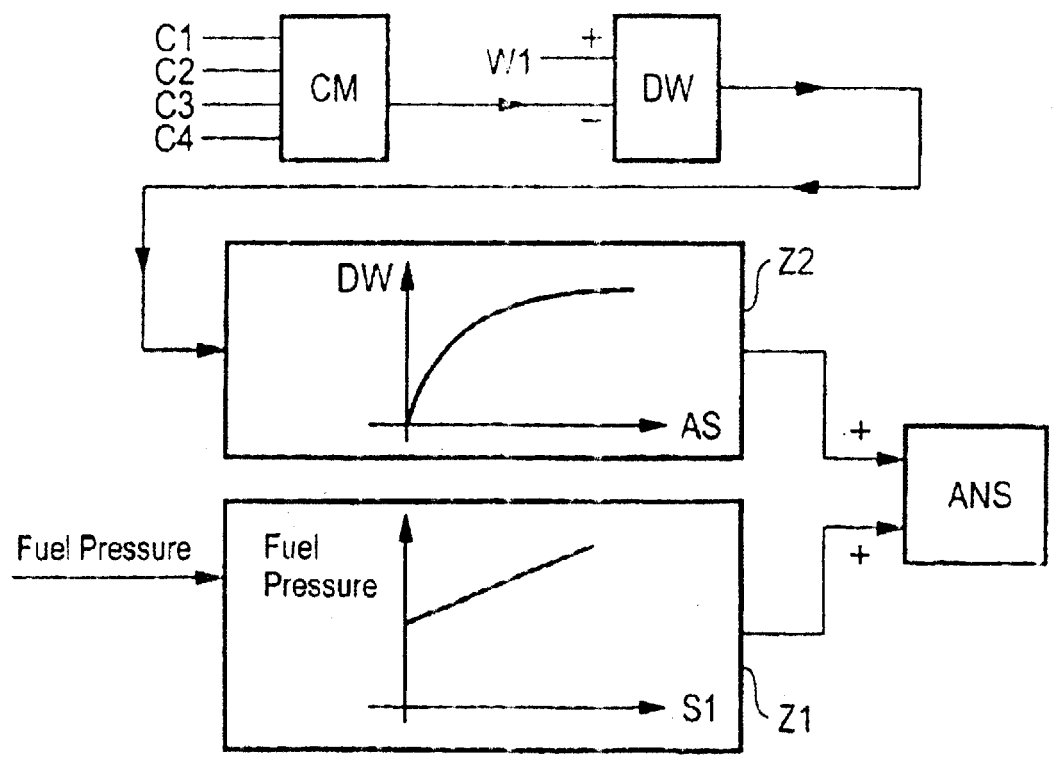
FIG. 2 is a flow diagram of a method for controlling the actuator.

An electronic control unit (ECU) which controls the actuators is provided. In the ECU, there is stored in a characteristics map a first assignment Z1 between fuel pressure and a first energy and hence a first voltage S1. The first assignment Z1 specifies the control energies and hence the control voltages ANS that are required in each case at operating temperature and at specific fuel pressures in order to achieve an optimal amount of fuel to be injected. Furthermore there is stored in a further characteristics map a second assignment Z2 of difference values DW to compensation energies and hence compensation voltages (see FIG. 2).

In order to activate the actuators A, the capacitances C1, C2, C3, C4 of the actuators A are determined in a first step. From the capacitances C1, C2, C3, C4, the mean value CM is formed. This mean value CM is deducted from a fixed stored value W1 in order to form a difference value DW. The fixed stored value W1 represents the mean value of the capacitances at an operating temperature that lies between 70° C. and 90° C.

On the basis of the second assignment Z2 the associated compensation energy and hence compensation voltage is determined from the difference value DW.

The fuel pressure is measured. On the basis of the first assignment Z1 the corresponding first energy and hence the first voltage S1 is determined from the fuel pressure.

Next, the first energy and the first compensation energy and hence the first voltage S1 and the compensation voltage AS are added in order to determine the control energy and hence the control voltage ANS of the actuators A.

The actuators A are activated by means of this determined control energy or control voltage ANS in order to displace the elements E.

What is claimed is:

1. A method for controlling a piezoelectric actuator that is actuatable to displace an element, wherein the actuator and the element are arranged so that a return stroke comprising a gap exists between the actuator and the element, the size of the return stroke being variable in response to ambient influences, said method comprising the steps of:

determining a current size of the return stroke by measuring at least one parameter that is indicative of the current size of the return stroke, the at least one parameter comprising a capacitance of the actuator; and applying a control voltage to the actuator to displace the element, the control voltage being selected such that it is dependent on the determined size of the return stroke to compensate for variations in the return stroke due to ambient influences, the control voltage including a sum of a first voltage and a compensation voltage, wherein only the compensation voltage portion of the sum is dependent on the determined size of the return stroke.

2. The method of claim 1, wherein the actuator and element are parts of a fuel injector, the method further comprising the step of regulating an amount of fuel to be injected by actuating the element with the actuator.

3. The method of claim 2, wherein the at least one parameter further comprises a fuel temperature.

4. The method of claim 2, wherein the fuel injector is used to drive an engine, said method further comprising the step of using a coolant temperature of the engine as a parameter for determining the compensation voltage.

5. The method of claim 2, wherein the fuel injector is used to drive an engine, said method further comprising the step of using a running tune of the engine as a parameter fur determining the compensation voltage.

6. The method of claim 1, wherein the compensation voltage is determined by calculating a difference between the value of the at least one parameter and a fixed stored value and determining the compensation voltage from a stored relationship of differences to compensation voltages.

7. The method of claim 2, wherein the compensation voltage is determined by calculating a difference between the value of the at least one parameter and a fixed stored value and determining the compensation voltage from a stored relationship of differences to compensation voltages.

8. The method of claim 7, further comprising the step of determining the value of the at least one parameter at a time after start up of the fuel injector at which there is a high probability that the fuel injector has reached its operating temperature, comparing the determined value with the fixed stored value, and replacing the fixed stored value with die determined value if there a deviation between the determined value and the fixed stored value.

9. The method of claim 1, wherein said control voltage is determined indirectly by determining a control energy required to actuate the element.

* * * * *